(12) United States Patent
Gu et al.

(10) Patent No.: US 12,174,373 B2
(45) Date of Patent: Dec. 24, 2024

(54) HEAD UP DISPLAY SYSTEM AND VEHICLE

(71) Applicant: Shanghai Tianma Micro-Electronics Co., Ltd., Shanghai (CN)

(72) Inventors: Yuefeng Gu, Shanghai (CN); Jiandong Wang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 631 days.

(21) Appl. No.: 17/401,377

(22) Filed: Aug. 13, 2021

(65) Prior Publication Data
US 2021/0373331 A1 Dec. 2, 2021

(30) Foreign Application Priority Data

May 19, 2021 (CN) .......................... 202110548248.1

(51) Int. Cl.
| | |
|---|---|
| *G02B 27/01* | (2006.01) |
| *B60K 35/00* | (2006.01) |
| *G02B 5/10* | (2006.01) |
| *G02B 5/30* | (2006.01) |
| *G02F 1/01* | (2006.01) |
| *B60K 35/23* | (2024.01) |
| *B60K 35/40* | (2024.01) |

(52) U.S. Cl.
CPC .......... *G02B 27/0101* (2013.01); *B60K 35/00* (2013.01); *G02B 5/10* (2013.01); *G02B 5/3025* (2013.01); *G02F 1/0136* (2013.01); *B60K 35/23* (2024.01); *B60K 35/425* (2024.01); *B60K 2360/23* (2024.01); *G02B 2027/0138* (2013.01)

(58) Field of Classification Search
CPC .... G02B 27/0101; G02B 5/10; G02B 5/3025; G02B 2027/0138; B60K 35/00; B60K 35/23; B60K 35/425; B60K 2360/23; G02F 1/0136
USPC .................................. 359/245, 630; 345/7–9
See application file for complete search history.

(56) References Cited

U.S. PATENT DOCUMENTS

2015/0355461 A1* 12/2015 Kessler .............. G02B 27/0101
 359/631
2020/0026075 A1 1/2020 Kim et al.

FOREIGN PATENT DOCUMENTS

| CN | 1514268 A | 7/2004 |
|---|---|---|
| CN | 105242402 A | 1/2016 |
| CN | 106461948 A | 2/2017 |

(Continued)

*Primary Examiner* — William Choi
(74) *Attorney, Agent, or Firm* — KDW Firm PLLC (57) ABSTRACT

Provided are a head up display system and a vehicle. The head up display system includes a control module, an image source module and an imaging module. The image source module includes a display component and a dimming component, and the dimming component includes a polarization state adjusting unit, a metal wire grid and a reflector. The display component is electrically connected to the control module. The polarization state adjusting unit is configured to modulate the imaging light into polarized light in a first polarization direction and polarized light in a second polarization direction. The imaging module is configured to transmit the polarized light in the first polarization direction or the polarized light in the second polarization direction to a windshield, and the windshield reflects the first polarization direction or the polarized light in the second polarization direction into a human eye for imaging.

20 Claims, 6 Drawing Sheets

(56) References Cited

FOREIGN PATENT DOCUMENTS

| | | | |
|---|---|---|---|
| CN | 108469645 A | 8/2018 | |
| CN | 109100866 A | 12/2018 | |
| CN | 109143576 A | 1/2019 | |
| CN | 213240680 U | 5/2021 | |
| EP | 3647117 A1 * | 5/2020 | ............... B60R 1/00 |
| JP | 2019089480 A * | 6/2019 | |
| JP | 2020144184 A | 9/2020 | |

* cited by examiner

HEAD UP DISPLAY SYSTEM AND VEHICLE

CROSS-REFERENCE TO RELATED APPLICATION(S)

This application claims priority to Chinese Patent Application No. 202110548248.1 filed May 19, 2021, the disclosure of which is incorporated herein by reference in its entirety.

TECHNICAL FIELD

Embodiments of the present disclosure relates to a head up display technology and, in particular, to a head up display system and a vehicle.

BACKGROUND

Head up display (HUD) has been widely used in the automobile field. The head up display is to project important information (such as a vehicle speed, navigation) displayed by an instrument onto a front windshield during the vehicle driving process, so that the driver can see the information in the instrument without lowering his head. This can not only help the fresh hand who is inexperienced in speed judgment control the vehicle speed and avoid the violation of regulation due to overspeed in a speed limit road section, but also help the driver instantly read without shifting the wide field and always maintain a best observation state.

The existing head up display system can present two layers of virtual images, and the virtual images that the user can see are two layers of images having different distances from the user. However, in one related art, light required for presenting the two layers of virtual images is provided by two different screens, which leads to higher cost and larger volume of the head up display system. In another related art, imaging light is provided by using one screen, and the double-layer image display is implemented by a motor driving a reflector to quickly turn over, which requires high precision of the motor, and has poor reliability and high cost.

SUMMARY

Embodiments of the present disclosure provide a head up display system and a vehicle, so that only one screen is needed to provide light required for presenting two layers of virtual images. Compared with using a double-screen structure, the volume of the head up display system is reduced, and the cost of the head up display system is reduced.

In a first aspect, an embodiment of the present disclosure provides a head up display system. The system includes a control module, an image source module and an imaging module. The image source module includes a display component and a dimming component, and the dimming component includes a polarization state adjusting unit, a metal wire grid and a reflector which are sequentially arranged along one side away from a light-emitting surface of the display component.

The display component is electrically connected to the control module, and the display component is configured to emit imaging light under the control of the control module.

The polarization state adjusting unit is electrically connected to the control module, where the polarization state adjusting unit is configured to modulate, in a first display period $t_1$, the imaging light into polarized light in a first polarization direction, where the polarized light in the first polarization direction is reflected to the imaging module through the metal wire grid; modulate, in a second display period $t_2$, the imaging light into polarized light in a second polarization direction, wherein the polarized light in the second polarization direction is transmitted to the reflector through the metal wire grid, and reflected to the imaging module through the reflector.

The imaging module is configured to transmit the polarized light in the first polarization direction or the polarized light in the second polarization direction to a windshield, and the windshield reflects the polarized light in the first polarization direction or the polarized light in the second polarization direction into a human eye for imaging.

In a second aspect, an embodiment of the present disclosure provides a vehicle. The system includes the above head up display system.

The head up display system provided by the embodiments of the present disclosure includes the control module, the image source module and the imaging module. The image source module includes the display component and the dimming component, and the dimming component includes the polarization state adjusting unit, the metal wire grid and the reflector which are sequentially arranged along one side away from the light-emitting surface of the display component. The display component is configured to emit imaging light under the control of the control module. The polarization state adjusting unit is configured to modulate, in a first display period $t_1$, the imaging light into polarized light in the first polarization direction, where the polarized light in the first polarization direction is reflected to the imaging module through the metal wire grid; modulate, in the second display period $t_2$, the imaging light into polarized light in the second polarization direction, where the polarized light in the second polarization direction is transmitted to the reflector through the metal wire grid, and reflected to the imaging module through the reflector; and the imaging module is configured to transmit the polarized light in the first polarization direction or the polarized light in the second polarization direction to a windshield, and the windshield reflects the polarized light in the first polarization direction or the polarized light in the second polarization direction into a human eye for imaging. Therefore, the augmented reality head up display effect is achieved through one display component and one dimming component in a time division manner, and the volume of the head up display system is smaller and the cost is lower.

DETAILED DESCRIPTION

The present disclosure is further described below in detail in conjunction with drawings and embodiments. It is to be understood that the embodiments described herein are merely intended to explain the present disclosure and not to limit the present disclosure. Additionally, it is to be noted that for ease of description, merely part, not all, of the structures related to the present disclosure are illustrated in the drawings.

Terms used in the embodiments of the present disclosure are merely used to describe specific embodiments and not intended to limit the present disclosure. It is to be noted that nouns of locality, including "on", "below", "left" and "right", used in the embodiments of the present disclosure are described from the angles shown in the drawings, and are not to be construed as a limitation to the present disclosure. In addition, in the context, it is to be understood that when an element is formed "on" or "below" another element, the element may not only be directly formed "on" or "below" another element, and may also be indirectly formed "on" or "below" another element via an intermediate element. The terms "first", "second" and the like are only used for description and used to distinguish between different components rather than indicate any order, quantity, or importance. For those of ordinary skill in the art, specific meanings of the preceding terms in the present utility model may be understood based on specific situations.

Figure 1:
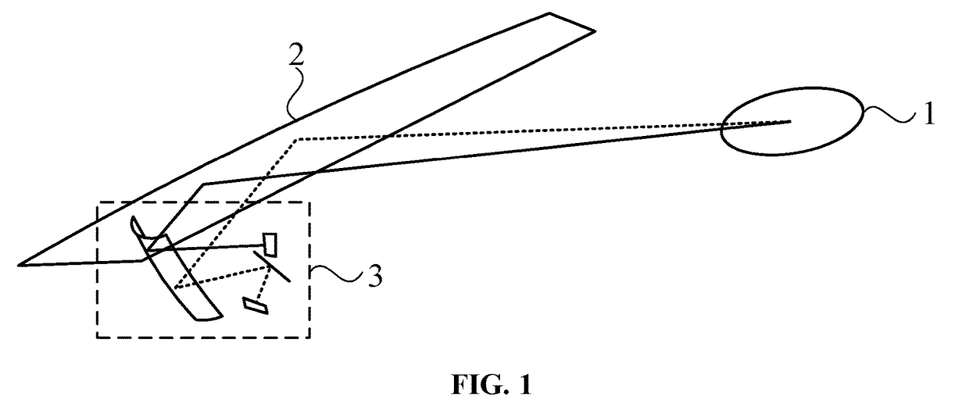
FIG. 1 is a structural view of a head up display system provided in the related art.
Figure 2:
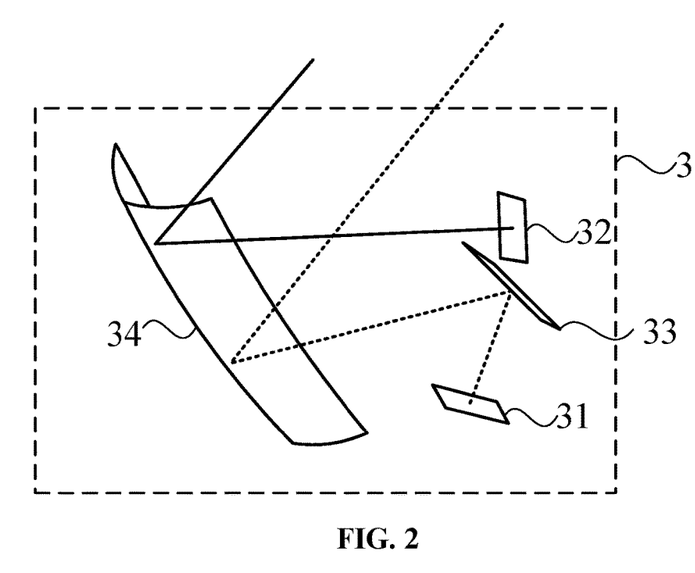
FIG. 2 is a partial enlarged schematic diagram of FIG. 1.

FIG. 1 is a structural view of a head up display system provided in the related art. FIG. 2 is a partial enlarged schematic diagram of FIG. 1. Referring to FIGS. 1 and 2, in a structure of an existing head up display system 3, a first display screen 31, a second display screen 32, a first reflector 33, and a second reflector 34. The first reflector 33 reflects contents displayed on the first display screen 31 to the second reflector 34, and then to a windshield 2 by the second reflector 34, so that a human eye 1 can see a first virtual image from the windshield 2. The second reflector 34 directly reflects contents displayed on the second display screen 32 to the windshield 2, so that the human eye 1 can see a second virtual image from the windshield 2. A depth of field of the first virtual image is different from a depth of field of the second virtual image. Since external light can also pass through the windshield, the user can see the augmented reality AR effect of superposing the two virtual images and the external light. However, the above structure requires two display screens, the first reflector 33 and the second reflector 34 are curved reflectors, and the first display screen 31 and the second display screen 32 face different directions, thereby occupying a large space and having a high cost.

Figure 3:
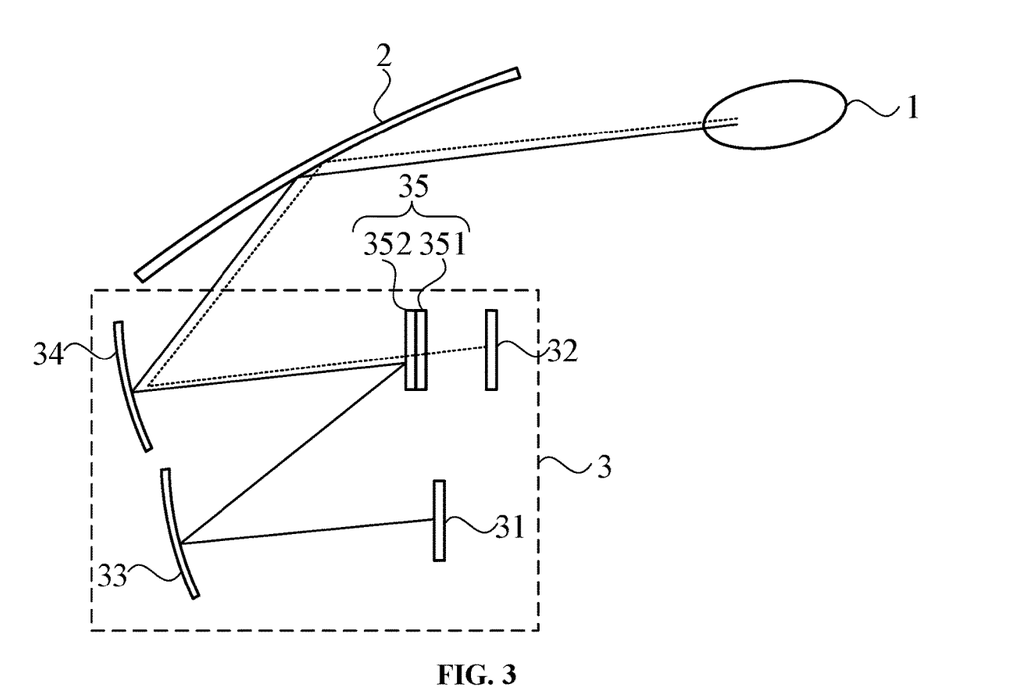
FIG. 3 is a structural view of another head up display system provided in the related art.

FIG. 3 is a structural view of another head up display system provided in the related art. Referring to FIG. 3, in another existing head up display system 3, a first display screen 31, a second display screen 32, a first reflector 33, a second reflector 34, and a beam splitter 35 are included. The beam splitter 35 includes a transparent substrate 351 and a reflective layer 352. The reflective layer 352 has wavelength selectivity, a wavelength band of light emitted from the first display screen 31 is located within a reflection band of the reflective layer 352 so as to be reflected by the reflective layer 352, and a wavelength band of light emitted from the second display screen 32 is located within a transmission band of the reflective layer 352 so as to be transmitted by the reflective layer 352. The light emitted from the first display screen 31 is sequentially reflected by the first reflector 33, the beam splitter 35, and the second reflector 34, and then incident on a windshield 2, so that a human eye 1 can see a first virtual image from the windshield 2; the light emitted from the second display screen 32 is incident on the windshield 2 after being transmitted through the beam splitter 35 and reflected by the second reflector 34. Therefore, the human eye 1 can see a second virtual image from the windshield 2. A depth of field of the first virtual image is different from a depth of field of the second virtual image. Since external light can also pass through the windshield, the user can see the augmented reality AR effect of superposing the two virtual images and the external light. However, the structure also requires two display screens, and has limits on the wavelength of the light, so that the color cast is easy to occur. To ensure that the light beam propagates according to a preset path, structures such as the display screen and the beam splitter need to be placed at a certain distance, and their structures are complex, thereby occupying a large space and having a high cost.

Figure 4:
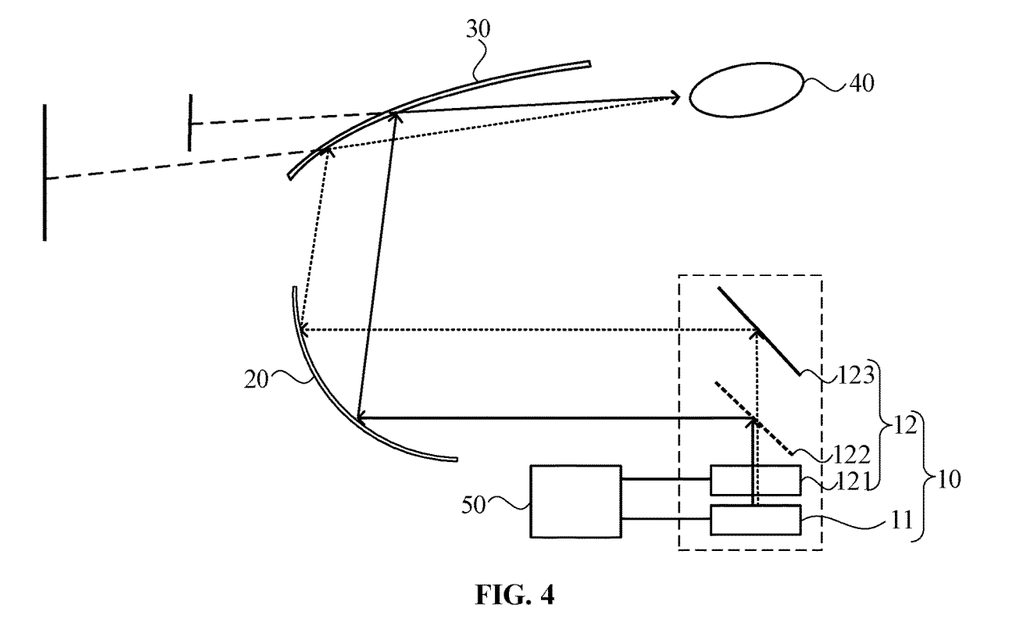
FIG. 4 is a structural view of a head up display system provided by an embodiment of the present disclosure.

For the above problems, an embodiment of the present disclosure provides a head up display system. FIG. 4 is a structural view of a head up display system provided by an embodiment of the present disclosure. Referring to FIG. 4, the head up display system in this embodiment includes a control module 50, an image source module 10 and an imaging module 20, where the image source module 10 includes a display component 11 and a dimming component 12. The dimming component 12 includes a polarization state adjusting unit 121, a metal wire grid 122 and a reflector 123 which are sequentially arranged along one side away from a light-emitting surface of the display component 11. The display component 11 is electrically connected to the control module, and the display component 11 is configured to emit imaging light under the control of the control module 50. The polarization state adjusting unit 121 is electrically connected to the control module 50. The polarization state adjusting unit 121 is configured to modulate, in a first display period $t_1$, the imaging light into polarized light in a first polarization direction, where the polarized light in the first polarization direction is reflected to the imaging module 20 through the metal wire grid 122; modulate, in a second display period $t_2$, the imaging light into polarized light in a second polarization direction, where the polarized light in the second polarization direction is transmitted to the reflector 123 through the metal wire grid 122, and reflected to the imaging module 20 through the reflector 123. The imaging module 20 is configured to transmit the polarized light in the first polarization direction or the polarized light in the second polarization direction to a windshield 30, and the windshield 30 reflects the polarized light in the first polarization direction or the polarized light in the second polarization into a human eye 40 for imaging.

The display component 11 may include any display device for emitting imaging light such as figures, characters or symbols. The embodiment of the present disclosure is not limited to the specific type, and any display device satisfying the above functions can be used as the display component 11. For example, the display component may include a display device such as a liquid crystal display (LCD) screen, an organic light-emitting diode (OLED) screen, a mini-LED screen, or a micro-LED screen capable of emitting light such as the figures, characters, or symbols, or may be a digital light processing (DLP) display device using a projection principle. Referring to FIG. 4, in this embodiment, only one display component 11 is provided, the display component 11 is horizontally arranged below the reflector 123. In the specific implementation, the display component 11 and the polarization state adjusting unit 121 may be integrated together, which only occupies a small thickness, so that the volume of the head up display system can be effectively reduced compared with the relatively large space occupied by the two display screens and the placement position in the related art. The metal wire grid 122 is a type of grating formed by multiple metal wires. The metal wires are a light-proof area, and a linear light-transmissive area is included between two adjacent metal wires. The metal wire grid 122 has a fixed transmission axis, which is capable of reflecting light whose polarization direction is parallel to an extension direction of the metal wires, and transmitting light whose polarization direction is perpendicular to the extension direction of the metal wires. In this embodiment, the polarized light in the first polarization direction is parallel to the extension direction of the metal wires and is reflected when incident on the metal wire grid 122. The polarized light in the second polarization direction is perpendicular to the extension direction of the metal wires and is transmitted when incident on the metal wire grid 122. In some embodiments, a polarization beam splitter (PBS) prism may also be selected to replace the metal wire grid 122 to achieve the same effect. The imaging module 20 may be a module for transmitting the polarized light in the first polarization direction or the polarized light in the second polarization direction to the windshield 30. In an embodiment, the imaging module 20 includes at least one of a spherical mirror, an aspheric mirror, or a free-curved mirror. The at least one of the spherical mirror, the aspheric mirror, or the free-curved mirror reflects the light to the windshield 30. A surface radian of the aspheric mirror is different from a mirror radian of the spherical mirror, the aspheric mirror may be a mirror surface whose radius of curvature is gradually increasing or decreasing from a center to a periphery of the mirror. The free-curved mirror may be a mirror with irregular mirror radian. Different mirrors may be selected according to actual requirements to improve the display effect of the head up display system. The embodiment of the present disclosure is not limited to the specific structure, and any module satisfying the above conditions can be used as the imaging module 20. The control module 50 may include a single chip microcomputer, a microcontroller, a microprocessor or a trip computer, and any apparatus or device capable of satisfying a control function of the control module 50 may be used as the control module 50. The polarization state adjusting unit 121 may modulate the imaging light into polarized light in the first polarization direction in the first display period $t_1$, the polarization direction of the polarized light in the first polarization direction is perpendicular to the extension direction of the metal wires of the metal wire grid 122. Therefore, the polarized light in the first polarization direction is reflected to the imaging module 20 through the metal wire grid 122 and is further reflected to the windshield 30 by the imaging module 20. The polarization state adjusting unit 121 may modulate the imaging light into polarized light in the second polarization direction in the second display period $t_2$, the polarization direction of the polarized light in the second polarization direction is parallel to the extension direction of the metal wires of the metal wire grid 122. Therefore, the polarized light in the second polarization direction can arrive to the reflector 123 by transmitting the metal wire grid 122. The polarized light in the second polarization direction is reflected to the imaging module 20 through the reflector and is further reflected to the windshield 30 by the imaging module 20. The polarized light in the first polarization direction and the polarized light in the second polarization direction are reflected by the windshield 30 to a human eye 40. Due to vision persistence phenomenon of the human eyes, that is, the human eye remains the image for 0.1 to 0.4 seconds when the image seen by the human eye disappears for a period of time. Therefore, during a period that the display component 11 produces each frame picture, a disappearance time of the polarized light in the first polarization direction and a disappearance of the polarized light in the second polarization direction are both less than 0.4 seconds. A first display time period $t_1$ and a second display time period $t_2$ may also be configured according to actual requirements to satisfy the need of human vision persistence. The user forms an augmented reality display effect by using external light passed through the windshield 30 and virtual images having different depths of field formed on the windshield 30 by the polarized light in the first polarization direction and polarized light in the second polarization direction which are alternately received.

In the technical solution of the embodiment of the present disclosure, the display component emits the imaging light under the control of the control module. The polarization state adjusting unit modulates, in the first display period $t_1$, the imaging light into the polarized light in the first polarization direction, where the polarized light in the first polarization direction is reflected to the imaging module through the metal wire grid; modulates, in the second display period $t_2$, the imaging light into the polarized light in the second polarization direction, where the polarized light in the second polarization direction is transmitted to the reflector through the metal wire grid, and reflected to the imaging module through the reflector; and the imaging module transmits the polarized light in the first polarization direction or the polarized light in the second polarization direction to the windshield, and the windshield reflects the polarized light in the first polarization direction or the polarized light in the second polarization direction into the human eye for imaging. Therefore, the augmented reality head up display effect is achieved through the display component and the dimming component in a time division manner, and the metal wire grid occupies little space, which is equivalent to inserting a structure with a very thin (about 1 mm) thickness in a blank area between the display screen and the first reflector compared with the existing art. Theoretically, the original module volume cannot be affected, so that the volume of the head up display system is smaller and the cost is lower.

Figure 5:
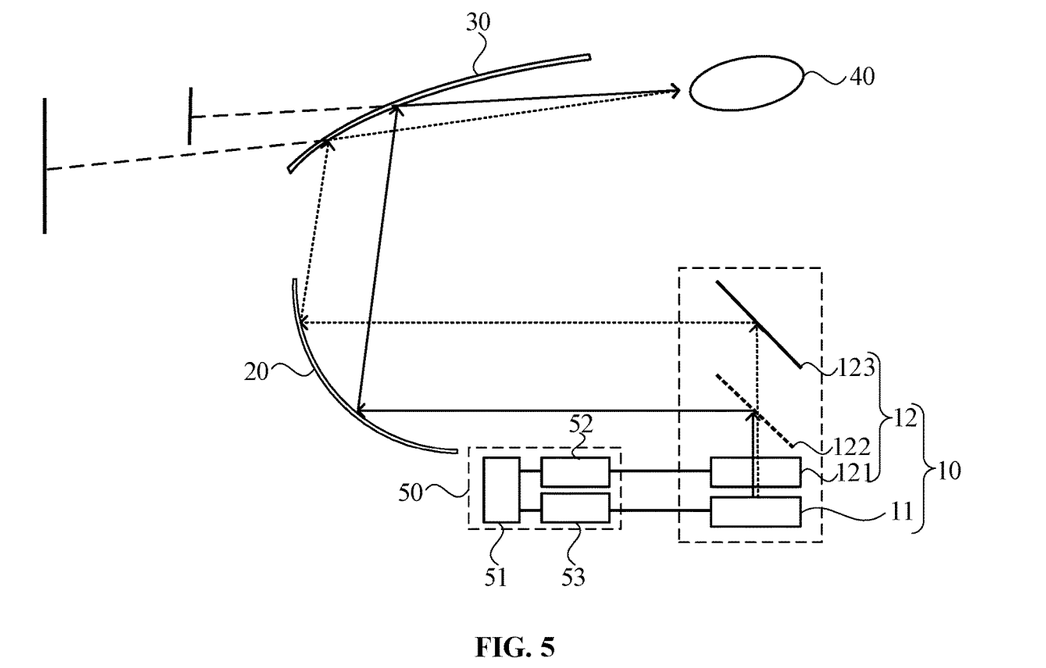
FIG. 5 is a structural view of another head up display system provided by an embodiment of the present disclosure.

FIG. 5 is a structural view of another head up display system provided by an embodiment of the present disclosure. Referring to FIG. 5, in an embodiment, a control module 50 includes a timing unit 51, a polarization state adjusting unit driving circuit 52, and a display component driving circuit 53. The polarization state adjusting unit driving circuit 52 is electrically connected to a polarization state adjusting unit 121 and is used for driving the polarization state adjusting unit 121. The display component driving circuit 53 is connected to the display component 11 and is used for driving the display component 11. Both the polarization state adjusting unit driving circuit 52 and the display component driving circuit 53 are connected to the timing unit 51, the timing unit 51 provides a same timing for the polarization state adjusting unit driving circuit 52 and the display component driving circuit 53 to enhance the synchronization between the polarization state adjusting unit 121 and the display component 11.

In other embodiments, the polarization state adjusting unit is located on a surface of a light-emitting side of the display component. In the specific implementation, the polarization state adjusting unit and the display component may be two independent devices. The polarization state adjusting unit may also be attached to the surface of the light-emitting side of the display component, where the polarization state adjusting unit may be a liquid crystal module located on the display component. The polarization state adjusting unit is combined with the display component, so that the volume of the image source module may be further reduced.

In an embodiment, the imaging light emitted from the display component is polarized light in a first polarization direction or polarized light in a second polarization direction, and the polarization state adjusting unit includes a twisted nematic liquid crystal cell or an electrically controlled birefringence liquid crystal cell.

It is to be understood that when the imaging light emitted from the display component is the polarized light in the first polarization direction, in a first display period $t_1$, the polarization state adjusting unit does not change a polarization state of the imaging light, and in a second display period $t_2$, the polarization state adjusting unit modulates the imaging light into the polarized light in the second polarization direction. When the imaging light emitted from the display component is the polarized light in the second polarization direction, in the first display period $t_1$, the polarization state adjusting unit modulates the imaging light into the polarized light in the first polarization direction, and in the second display period $t_2$, the polarization state adjusting unit does not change the polarization state of the imaging light. A vibration direction of the polarized light in the first polarization direction is perpendicular to a vibration direction of the polarized light in the second polarization direction, that is, a function of the polarization state adjusting unit is to rotate a polarization direction of the imaging light by 0° (not adjusting the polarization state) or 90°. The polarization state adjusting unit includes the twisted nematic liquid crystal cell or the electrically controlled birefringence liquid crystal cell.

The twisted nematic liquid crystal cell or the electrically controlled birefringence liquid crystal cell may be arranged separately or be attached to the display component. The following description is illustrated merely by using the solution in which the twisted nematic liquid crystal cell or the electrically controlled birefringence liquid crystal cell is arranged separately. It is to be noted that, a structure of the twisted nematic liquid crystal cell in the solution in which the twisted nematic liquid crystal cell or the electrically controlled birefringence liquid crystal cell is arranged separately is same as a structure of the twisted nematic liquid crystal cell in the solution in which the twisted nematic liquid crystal cell or the electrically controlled birefringence liquid crystal cell is attached to the display component, thus the structure of the twisted nematic liquid crystal cell in the solution in which the twisted nematic liquid crystal cell or the electrically controlled birefringence liquid crystal cell is attached to the display component is not be repeated.

Figure 6:
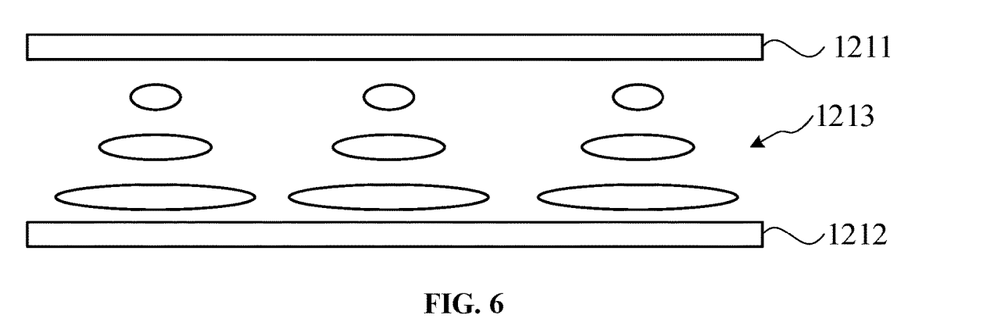
FIG. 6 is a structural view of a twisted nematic liquid crystal cell provided by an embodiment of the present disclosure.
Figure 7:
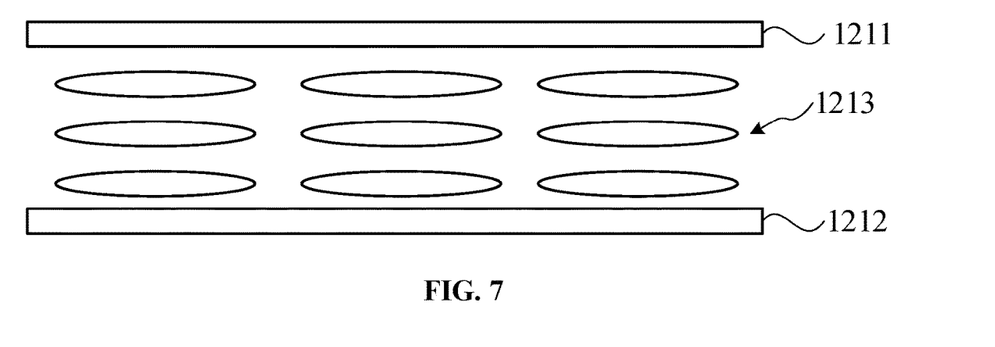
FIG. 7 is a structural view of a twisted nematic liquid crystal cell after a preset voltage is applied between a first electrode plate and a second electrode plate.

A basic structure of the twisted nematic liquid crystal cell is similar to a basic structure of the electrically controlled birefringence liquid crystal cell, both of which change the arrangement of liquid crystal molecules by applying an electric field so as to adjust the polarization state of the light. In the specific implementation, to further reduce the volume of the system, the twisted nematic liquid crystal cell and the electrically controlled birefringence liquid crystal cell may be attached to a light-emitting surface of the display component. Exemplarily, FIG. 6 is a structural view of a twisted nematic liquid crystal cell provided by an embodiment of the present disclosure. Referring to FIG. 6, the twisted nematic liquid crystal cell includes a first electrode plate 1211, a second electrode plate 1212 and a liquid crystal layer 1213. Under initial conditions, liquid crystal molecules in the liquid crystal layer 1213 are arranged in a twisted shape, such as rotating 90° from bottom to top. In a case where no voltage is applied between the first electrode plate 1211 and the second electrode plate 1212, the polarization state is rotated by 90° when the light passes through the twisted nematic liquid crystal cell. In a case where a preset voltage is applied between the first electrode plate 1211 and the second electrode plate 1212, FIG. 7 is a structural view of the twisted nematic liquid crystal cell after the preset voltage is applied between the first electrode plate and the second electrode plate, the liquid crystal molecules deflect under the action of the electric field, when the preset voltage just causes the liquid crystal molecules to be arranged in parallel, the polarization state does not change when the light passes through the twisted nematic liquid crystal cell. A size of the preset voltage is determined according to the actual situation. In the specific implementation, the surface of the light-emitting side of the display component may face the twisted nematic liquid crystal cell and be located below the twisted nematic liquid crystal cell. When the display component emits non-linearly polarized light, a polarizer may also be provided between the display component and the twisted nematic liquid crystal cell, where a polarization direction of the polarized light emitted from the display component or a polarization direction of the light transmitted by the polarizer is matched with an initial orientation of the liquid crystal molecules in the twisted nematic liquid crystal cell. In a case where the polarization state adjusting unit is the electrically controlled birefringence (ECB) cell, an optical principle is similar to that of the twisted nematic liquid crystal cell, except that the electrically controlled birefringence liquid crystal cell uses the liquid crystal ECB effect to change the polarization state of the light. It is to be noted that electrode plates for controlling the liquid crystal molecules to deflect located on upper and lower sides as shown in FIG. 6 are merely illustratively. In other embodiments, two electrode plates may be arranged on a same side of the liquid crystal layer, similarly forming a liquid crystal cell converting IPS in a plane direction.

In an embodiment, the display component includes an organic light-emitting display panel and the polarizer located on the light-emitting side of the organic light-emitting display panel, or the display component includes a liquid crystal display panel.

In the case where the display component includes the organic light-emitting display panel, the polarizer may be provided on the light-emitting side of the organic light-emitting display panel, so that the display component emits the polarized light. Specifically, a structure of the organic light-emitting display panel or the liquid crystal display panel is same as a panel structure in the existing art as long as the polarized light emitted from the display component is designed to match the initial orientation of the liquid crystal molecules, and details will not be repeated here.

In a case where the polarization state of the imaging light emitted from the display component 11 is perpendicular to an extension direction of metal wires of a metal wire grid, a first voltage difference may be applied between the first electrode plate 1211 and the second electrode plate 1212 of the twisted nematic liquid crystal cell in the first display period $t_1$ so that an arrangement direction of the liquid crystal molecules located between the first electrode plate 1211 and the second electrode plate 1212 is laterally deflected, and the polarization direction of the polarized light becomes the first polarization direction. The polarized light in the first polarization direction is reflected to an imaging module through the metal wire grid. A second voltage difference may be applied between the first electrode plate 1211 and the second electrode plate 1212 of the twisted nematic liquid crystal cell in the second display period $t_2$ so that the arrangement direction of the liquid crystal molecules located between the first electrode plate 1211 and the second electrode plate 1212 is not deflected, and the polarization direction of the polarized light becomes the second polarization direction. The polarized light in the second polarization direction is transmitted to the reflector through the metal wire grid, and then is reflected to the imaging module through the reflector. The first voltage difference and the second voltage difference may be determined according to actual requirements.

In a case where the polarization state of the imaging light emitted from the display component 11 is parallel to an extension direction of metal wires of a metal wire grid, the second voltage difference may be applied between the first electrode plate 1211 and the second electrode plate 1212 of the twisted nematic liquid crystal cell in the first display period $t_1$ so that the arrangement direction of the liquid crystal molecules located between the first electrode plate 1211 and the second electrode plate 1212 does not deflect, and the polarization direction of the polarized light is changed by 90° and becomes the first polarization direction. The polarized light in the first polarization direction is reflected to the imaging module through the metal wire grid. The first voltage difference may be applied between the first electrode plate 1211 and the second electrode plate 1212 of the twisted nematic liquid crystal cell in the second display period $t_2$, and the polarization direction of the polarized light does not need to be changed and is the second polarization direction. The polarized light in the second polarization direction is transmitted to the reflector through the metal wire grid, and then is reflected to the imaging module through the reflector.

With the development of display technology, the picture displayed by the head up display system becomes increasingly diversified. In some embodiments, the display component may be a color display component. Since a refractive index of the medium is related to a wavelength of the light, in the case where the polarization state adjusting unit adopts the electrically controlled birefringence liquid crystal cell, a structure similar to the structure of the twisted nematic liquid crystal cell may not satisfy display requirements. It is to be understood that the electrically controlled birefringence liquid crystal cell may be arranged separately or be attached to the display component. The display component may include an LCD screen or an OLED screen. The following description is illustrated merely by using the solution in which the electrically controlled birefringence liquid crystal cell is attached to the display component. It is to be noted that a structure of the electrically controlled birefringence liquid crystal cell in the solution in which the electrically controlled birefringence liquid crystal cell is attached to the display component is same as a structure of the electrically controlled birefringence liquid crystal cell in the solution in which the electrically controlled birefringence liquid crystal cell is arranged separately, thus the structure of the electrically controlled birefringence liquid crystal cell in the solution in which the electrically controlled birefringence liquid crystal cell is arranged separately is not be repeated here.

In an embodiment, the display component includes multiple sub-pixels arranged in an array. The polarization state adjusting unit includes the electrically controlled birefringence liquid crystal cell. The birefringence liquid crystal cell includes multiple pixel electrodes corresponding to the multiple sub-pixels, and in a case where the electrically controlled birefringence liquid crystal cell changes the polarization state of the light emitted from the display component, the pixel electrodes enable a liquid crystal layer in the electrically controlled birefringence liquid crystal cell to satisfy $$\Delta nd = \frac{\lambda}{2};$$

$\Delta n$ is a refractive index difference of a birefringence of the liquid crystal layer, d is a thickness of the liquid crystal layer and $\lambda$ is a light-emitting wavelength of the corresponding sub-pixels.

Figure 8:
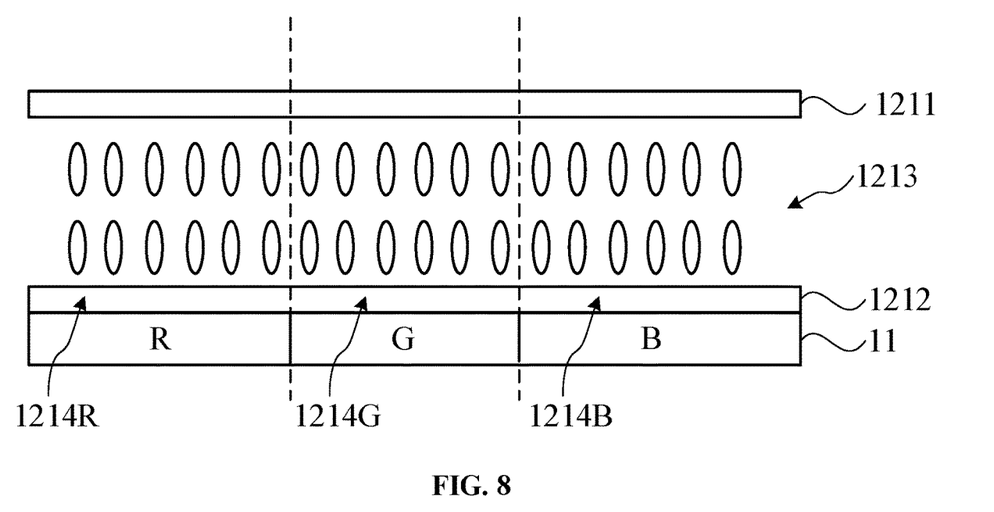
FIG. 8 is a structural view of an electrically controlled birefringence liquid crystal cell provided by an embodiment of the present disclosure.
Figure 9:
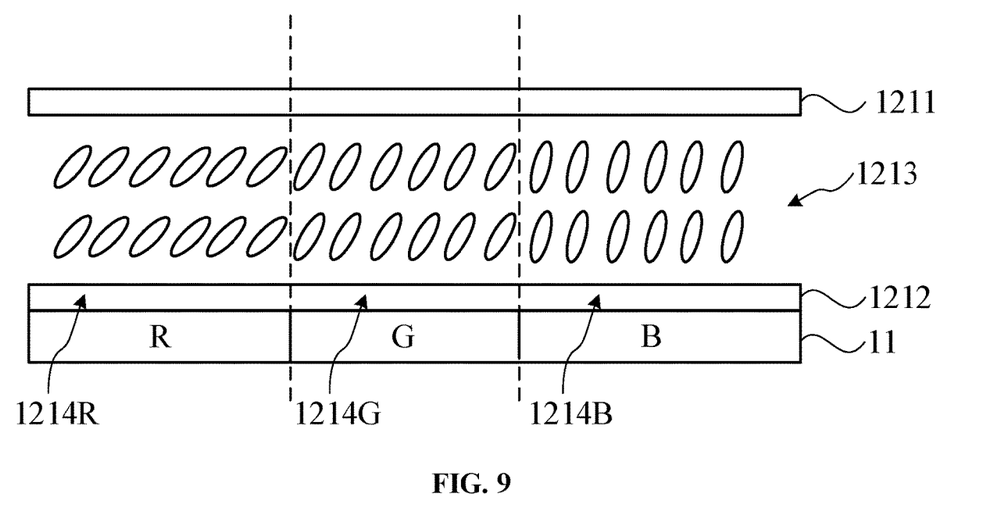
FIG. 9 is a structural view of applying different voltages to different sub-pixel areas of an electrically controlled birefringence liquid crystal cell.

Exemplarily, FIG. 8 is a structural view of an electrically controlled birefringence liquid crystal cell provided by an embodiment of the present disclosure. The electrically controlled birefringence liquid crystal cell may include a first electrode plate 1211, a second electrode plate 1212 and a liquid crystal layer 1213. The liquid crystal layer 1213 may be located between the first electrode plate 1211 and the second electrode plate 1212. The surface of the light-emitting side of the display assembly 11 may be arranged facing the electrically controlled birefringence liquid crystal cell and located below the electrically controlled birefringence liquid crystal cell. The display component 11 includes multiple sub-pixels arranged in an array (FIG. 8 merely schematically shows one red sub-pixel R, one green sub-pixel G and one blue sub-pixel B). A liquid crystal layer of a birefringence liquid crystal cell includes regions corresponding to the multiple sub-pixels respectively. The second electrode plate 12 includes a pixel electrode 1214R, a pixel electrode 1214G and a pixel electrode 1214B corresponding to the red sub-pixel R, the green sub-pixel G and the blue sub-pixel B respectively. Each pixel electrode controls a liquid crystal deflection in one pixel region. Exemplarily, FIG. 9 is a structural view of applying different voltages to different sub-pixel areas of the electrically controlled birefringence liquid crystal cell. In the case where the electrically controlled birefringence liquid crystal cell changes the polarization state of the light emitted from the display component 11, the pixel electrodes enable a liquid crystal layer in the electrically controlled birefringence liquid crystal cell to satisfy $$\Delta nd = \frac{\lambda}{2}$$

so that the polarization direction of different extended light is rotated by 90°, and the transmittance of each sub-pixel is ensured to be consistent, thus the display effect is improved.

In a case where the polarization state of the imaging light emitted from the display component 11 is parallel to the extension direction of the metal wires of the metal wire grid, the first voltage difference may be applied between the first electrode plate 1211 and the second electrode plate 1212 of the electrically controlled birefringence liquid crystal cell in the first display period $t_1$ so that the arrangement direction of the liquid crystal molecules located between the first electrode plate 1211 and the second electrode plate 1212 does not need to be changed. After the polarized light passes through the liquid crystal layer 1213 of the electrically controlled birefringence liquid crystal cell, the polarization direction of the polarized light is changed by 90° and becomes the first polarization direction. The polarized light in the first polarization direction is reflected to the imaging module through the metal wire grid. The second voltage difference may be applied between the first electrode plate 1211 and the second electrode plate 1212 of the electrically controlled birefringence liquid crystal cell in the second display period $t_2$ so that all liquid crystal molecules in the electrically controlled birefringence liquid crystal cell stand vertically. The polarization direction of the polarized light does not change, and maintains the second polarization direction. The polarized light in the second polarization direction is transmitted to the reflector through the metal wire grid, and then is reflected to the imaging module through the reflector.

In a case where the polarization state of the imaging light emitted from the display component 11 is perpendicular to the extension direction of the metal wires of the metal wire grid, the second voltage difference may be applied between the first electrode plate 1211 and the second electrode plate 1212 of the electrically controlled birefringence liquid crystal cell in the first display period $t_1$ so that all liquid crystal molecules in the electrically controlled birefringence liquid crystal cell stand vertically. The polarization direction of the polarized light does not change, and maintains the first polarization direction. The polarized light in the first polarization direction is reflected to the imaging module through the metal wire grid. The first voltage difference may be applied between the first electrode plate 1211 and the second electrode plate 1212 of the electrically controlled birefringence liquid crystal cell in the second display period $t_2$ so that the arrangement direction of the liquid crystal molecules located between the first electrode plate 1211 and the second electrode plate 1212 does not need to be changed. After the polarized light passes through the liquid crystal layer 1213 of the electrically controlled birefringence liquid crystal cell, the polarization direction of the polarized light is changed by 90° and becomes the second polarization direction. The polarized light in the second polarization direction is transmitted to the reflector through the metal wire grid, and then is reflected to the imaging module through the reflector. The first voltage difference and the second voltage difference may be determined according to actual requirements.

Figure 10:
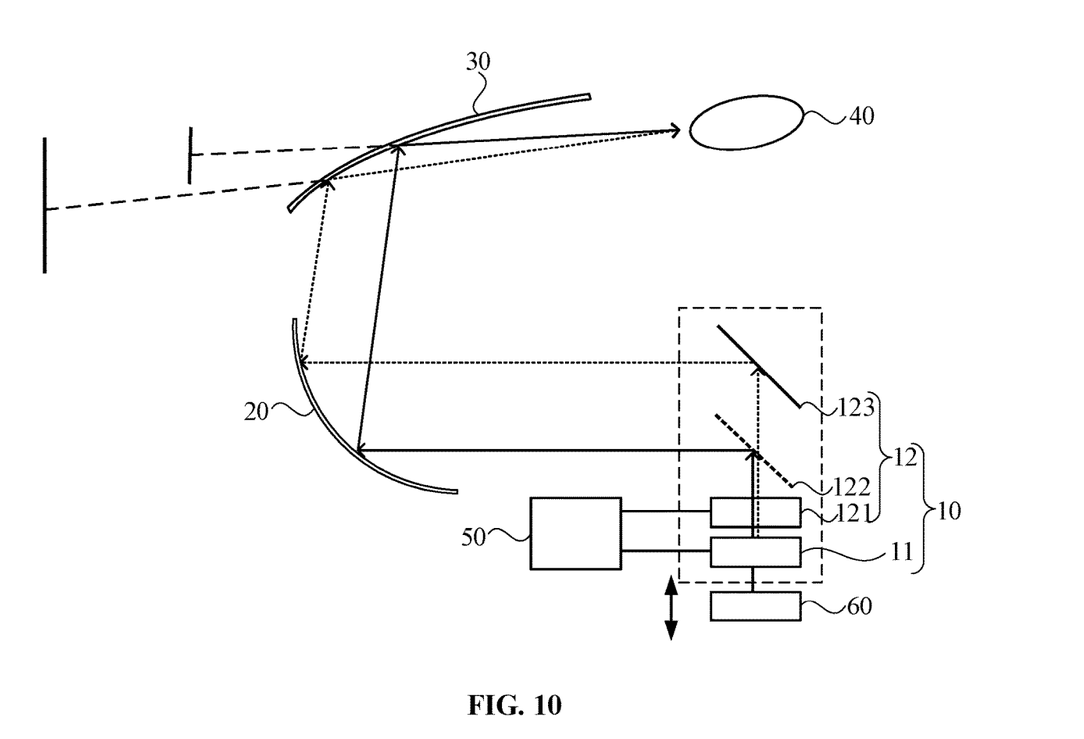
FIG. 10 is a structural view of another head up display system provided by an embodiment of the present disclosure.

FIG. 10 is a structural view of another head up display system provided by an embodiment of the present disclosure. Referring to FIG. 10, in an embodiment, the head up display system provided in this embodiment further includes a first moving motor 60. The first moving motor 60 is connected to a display component 11, and the first moving motor 60 is configured to drive the display component 11 to move in a direction perpendicular to a plane where a light-emitting surface of the display component 11 is located.

The light beam emitted from the display unit 11 is approximately parallel light. In a case where the first moving motor 60 adjusts a distance between the display component 11 and the dimming component 12 in a direction perpendicular to a plane where the light-emitting surface of the display component 11 is located, an object distance in a vertical direction of the head up display system may be changed, thereby adjusting depths of field of virtual images. Since the object distance is equal to an image distance in a reflective imaging system, the first moving motor 60 may be controlled in real time as needed to achieve the purpose of adjusting the image distance of the virtual images of the head up display system.

Figure 11:
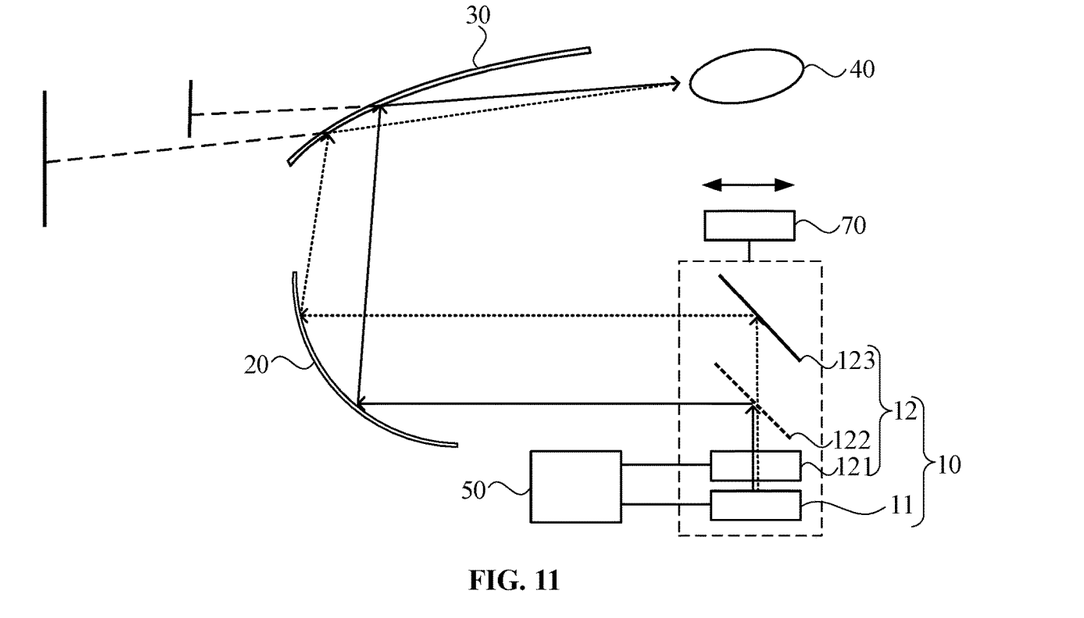
FIG. 11 is a structural view of another head up display system provided by an embodiment of the present disclosure.

FIG. 11 is a structural view of another head up display system provided by an embodiment of the present disclosure. Referring to FIG. 11, in an embodiment, the head up display system provided in this embodiment further includes a second moving motor 70. The second moving motor 70 is connected to the image source module 10, and the second moving motor 70 is configured to drive the image source module 10 to move in a direction parallel to the plane where the light-emitting surface of the display component 11 is located to change a distance between the image source module 10 and the imaging module 20.

The second moving motor 70 may adjust the distance between the display component 11 and the dimming component 12 in the direction parallel to the plane where the light-emitting surface of the display component 11 is located, that is, an object distance in a horizontal direction of the head up display system. The second moving motor 70 may be controlled in real time as needed to achieve the purpose of adjusting the image distance of the virtual images of the head up display system. In other embodiments, a position of the imaging module 20 may also be moved to achieve the object distance adjustment, and the specific implementation can be designed according to the actual situation.

Figure 12:
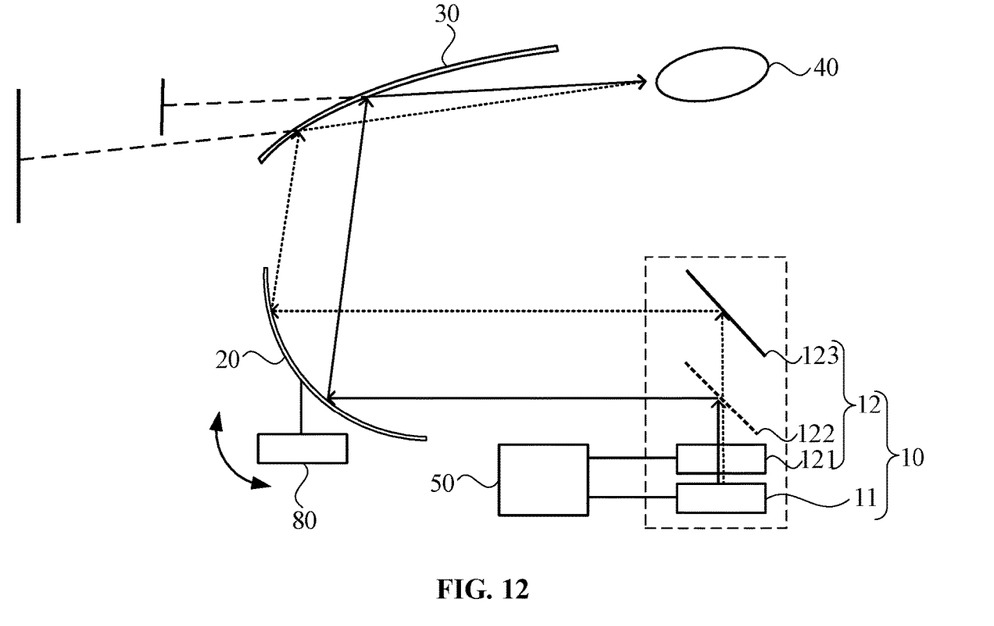
FIG. 12 is a structural view of another head up display system provided by an embodiment of the present disclosure.

FIG. 12 is a structural view of another head up display system provided by an embodiment of the present disclosure. Referring to FIG. 12, in an embodiment, the head up display system provided in this embodiment further includes a rotating motor 80 connected to an imaging module 20, and the rotating motor 80 is used for driving the imaging module 20 to rotate to adjust an imaging height.

The rotating motor 80 is controlled to rotate, so that an incident angle and an emission angle of the polarized light in the second polarization direction and the polarized light in the first polarization direction relative to the imaging module 20 can be adjusted, and then the imaging height can be adjusted, so that the imaging position can be arranged flexibly. In other embodiments, the head up display system may include any one or more of a first moving motor, a second moving motor, and a rotating motor, which may rotate according to the actual situation.

In other embodiments, $$\frac{1}{t_1} + \frac{1}{t_2} \geq 120\,\text{Hz}.$$

$t_1$ and $t_2$ are shortened, so that refresh rates of the polarized light in the first polarization direction and the polarized light in the second polarization direction are ensured to be increased. In a case of $$\frac{1}{t_1} + \frac{1}{t_2} \geq 120\,\text{Hz},$$

refresh rates of two virtual images formed by the polarized light in the first polarization direction and the polarized light in the second polarization direction are greater than or equal to 120 Hz, and the formed virtual images are smooth and continuous.

In other embodiments, $$\frac{1}{t_1} = \frac{1}{t_2}.$$

In a case of $$\frac{1}{t_1} = \frac{1}{t_2},$$

the polarized light in the first polarization direction and the polarized light in the second polarization direction have same refresh rates, thus virtual images formed by the polarized light in the first polarization direction and the polarized light in the second polarization direction have same refresh rates. $t_1$ and $t_2$ may be same. The first polarization direction polarized light and the second polarization direction polarized light have a same light-emitting duration, thus when the display component in the first display period $t_1$ and the second display period $t_2$ has a same brightness, due to the vision persistence phenomenon, the virtual images formed by the polarized light in the first polarization direction and the polarized light in the second polarization direction have the same brightness.

Figure 13:
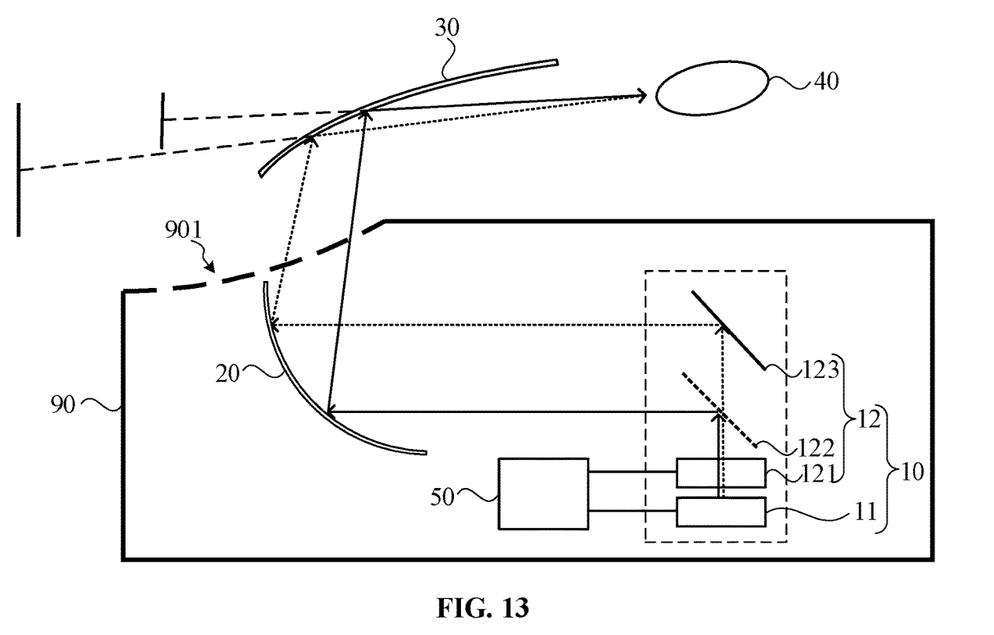
FIG. 13 is a structural view of another head up display system provided by an embodiment of the present disclosure.

FIG. 13 is a structural view of another head up display system provided by an embodiment of the present disclosure. Referring to FIG. 13, the head up display system provided in this embodiment further includes a housing 90. A control module 50, an image source module 10 and an imaging module 20 are all arranged in the housing 90, and the housing 90 is provided with a light-transmitting window 901 for transmitting imaging light transmitted from the imaging module 20 to a windshield 30.

The housing 90 may be made of a black high temperature resistance plastic material, and the light-transmitting window 901 may be a window formed on the housing. In other embodiments, an incident surface and/or an emission surface of the light-transmitting window 901 is provided with an anti-reflection film.

The light-transmitting window 901 may include a transparent dielectric layer, and the anti-reflection film may be provided on a surface of the transparent dielectric layer. The transparent dielectric layer is arranged so that the dust can be prevented from entering the housing 90. The anti-reflection film is provided so that the reflection of the polarized light in the first polarization direction and the polarized light in the second polarization direction on the transparent dielectric layer can be reduced and the light loss on the optical path can be reduced.

In other embodiments, a grating period of the metal wire grid ranges from 1 nm to 200 nm.

The grating period is a length from one refractive index change point to another adjacent refractive index change point. The metal wire grid with different grating periods may be selected according to actual needs, so that the polarized light in the first polarization direction and the polarized light in the second polarization direction can be better separated.

In an embodiment, the grating period of the metal wire grid ranges from 40 nm to 80 nm. The effect is better when the grating period is one tenth of the wavelength of the light. Since the head up display system uses the visible light to image, the visible light approximately ranges between 400 nm to 800 nm, thus the grating period of the metal wire grid ranges between 40 nm to 80 nm.

In an embodiment, the reflector and the metal wire grid are parallel to each other.

The reflector and the metal wire grid are parallel to each other, so that the polarized light in the first polarization direction and the polarized light in the second polarization direction are kept parallel after being reflected by the reflector or the metal wire grid, and an area required by the imaging module for receiving the polarized light in the first polarization direction and the polarized light in the second polarization direction is small, which facilitates the miniaturization of the head up display system.

An embodiment of the present disclosure further provides a vehicle, which includes any head up display system provided in the above embodiment. The vehicle may be a vehicle provided with a transparent windshield, such as an automobile or an airplane.

The vehicle provided by the embodiment of the present disclosure includes the head up display system provided by any embodiment of the present disclosure, and has same or corresponding beneficial effects as the head up display system.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure has been described in detail via the preceding embodiments, the present disclosure is not limited to the preceding embodiments and may include more equivalent embodiments without departing from the inventive concept of the present disclosure. The scope of the present disclosure is determined by the scope of the appended claims.

What is claimed is:

1. A head up display system, comprising a control module, an image source module and an imaging module, wherein the image source module comprises a display component and a dimming component, and the dimming component comprises a polarization state adjusting unit, a metal wire grid and a reflector, wherein the polarization state adjusting unit, the metal wire grid and the reflector are sequentially arranged along a side away from a light-emitting surface of the display component;

wherein the display component is electrically connected to the control module, and the display component is configured to emit imaging light under control of the control module;

wherein the polarization state adjusting unit is electrically connected to the control module, wherein the polarization state adjusting unit is configured to modulate, in a first display period $t_1$, the imaging light into polarized light in a first polarization direction, and the polarized light in the first polarization direction is reflected to the imaging module through the metal wire grid, and wherein the polarization state adjusting unit is configured to modulate, in a second display period $t_2$, the imaging light into polarized light in a second polarization direction, and the polarized light in the second polarization direction is transmitted to the reflector through the metal wire grid, and reflected to the imaging module through the reflector; and wherein the imaging module is configured to transport the polarized light in the first polarization direction or the polarized light in the second polarization direction to a windshield, and the windshield reflects the polarized light in the first polarization direction or the polarized light in the second polarization direction into a human eye for imaging, wherein the polarization state adjusting unit is located on a surface of a light-emitting side of the display component.

2. The head up display system of claim 1, wherein the imaging light emitted from the display component is the polarized light in the first polarization direction or the polarized light in the second polarization direction, and the polarization state adjusting unit comprises a twisted nematic liquid crystal cell or an electrically controlled birefringence liquid crystal cell.

3. The head up display system of claim 2, wherein the display component comprises an organic light-emitting display panel and a polarizer located on the light-emitting side of the organic light-emitting display panel, or the display component comprises a liquid crystal display panel.

4. The head up display system of claim 2, wherein the display component comprises a plurality of sub-pixels arranged in an array, and the polarization state adjusting unit comprises the electrically controlled birefringence liquid crystal cell;

wherein the birefringence liquid crystal cell comprises a plurality of pixel electrodes corresponding to the plurality of sub-pixels, and in a case where the electrically controlled birefringence liquid crystal cell changes a polarization state of the light emitted from the display component, the plurality of pixel electrodes enables a liquid crystal layer in the electrically controlled birefringence liquid crystal cell to satisfy $$\Delta nd = \frac{\lambda}{2};$$

and wherein $\Delta n$ represents a refractive index difference of a birefringence of the liquid crystal layer, d represents a thickness of the liquid crystal layer and $\lambda$ represents a light-emitting wavelength of the plurality of sub-pixels corresponding to the plurality of pixel electrodes.

5. The head up display system of claim 1, further comprising: a first moving motor, wherein the first moving motor is connected to the display component, and the first moving motor is configured to drive the display component to move in a direction perpendicular to a plane where the light-emitting surface of the display component is located.

6. The head up display system of claim 1, further comprising: a second moving motor, wherein the second moving motor is connected to the image source module, and the second moving motor is configured to drive the image source module to move in a direction parallel to a plane where the light-emitting surface of the display component is located, so as to change a distance between the image source module and the imaging module.

7. The head up display system of claim 1, further comprising: a rotating motor connected to the imaging module, wherein the rotating motor is configured to drive the imaging module to rotate, so as to adjust an imaging height.

8. The head up display system of claim 1, wherein $$\frac{1}{t_1} + \frac{1}{t_2} \geq 120\,\text{Hz}.$$

9. The head up display system of claim 1, wherein $$\frac{1}{t_1} = \frac{1}{t_2}.$$

10. The head up display system of claim 1, further comprising: a housing, wherein the control module, the image source module and the imaging module are all arranged in the housing, and the housing is provided with a light-transmitting window, and the light-transmitting window is configured to transmit the imaging light transported from the imaging module to the windshield.

11. The head up display system of claim 10, wherein at least one of an incident surface of the light-transmitting window or an emission surface of the light-transmitting window is provided with an anti-reflection film.

12. The head up display system of claim 1, wherein a grating period of the metal wire grid ranges from 1 nm to 200 nm.

13. The head up display system of claim 12, wherein the grating period of the metal wire grid ranges from 40 nm to 80 nm.

14. The head up display system of claim 1, wherein the imaging module comprises at least one of a spherical mirror, an aspheric mirror, or a free-curved mirror.

15. The head up display system of claim 1, wherein the reflector and the metal wire grid are parallel to each other.

16. A vehicle, comprising: a head up display system, wherein the head up display system comprises a control module, an image source module and an imaging module, wherein the image source module comprises a display component and a dimming component, and the dimming component comprises a polarization state adjusting unit, a metal wire grid and a reflector, wherein the polarization state adjusting unit, the metal wire grid and the reflector are sequentially arranged along a side away from a light-emitting surface of the display component;

wherein the display component is electrically connected to the control module, and the display component is configured to emit imaging light under control of the control module;

wherein the polarization state adjusting unit is electrically connected to the control module, wherein the polarization state adjusting unit is configured to modulate, in a first display period $t_1$, the imaging light into polarized light in a first polarization direction, and the polarized light in the first polarization direction is reflected to the imaging module through the metal wire grid, and wherein the polarization state adjusting unit is configured to modulate, in a second display period $t_2$, the imaging light into polarized light in a second polarization direction, and the polarized light in the second polarization direction is transmitted to the reflector through the metal wire grid, and reflected to the imaging module through the reflector; and wherein the imaging module is configured to transport the polarized light in the first polarization direction or the polarized light in the second polarization direction to a windshield, and the windshield reflects the polarized light in the first polarization direction or the polarized light in the second polarization direction into a human eye for imaging, wherein the polarization state adjusting unit is located on a surface of a light-emitting side of the display component.

17. The vehicle of claim 16, wherein the head up display system further comprises: a housing, wherein the control module, the image source module and the imaging module are all arranged in the housing, and the housing is provided with a light-transmitting window, and the light-transmitting window is configured to transmit the imaging light transported from the imaging module to the windshield.

18. The vehicle of claim 17, wherein at least one of an incident surface of the light-transmitting window or an emission surface of the light-transmitting window is provided with an anti-reflection film.

19. A head up display system, comprising a control module, an image source module and an imaging module, wherein the image source module comprises a display component and a dimming component, and the dimming component comprises a polarization state adjusting unit, a metal wire grid and a reflector, wherein the polarization state adjusting unit, the metal wire grid and the reflector are sequentially arranged along a side away from a light-emitting surface of the display component;

wherein the display component is electrically connected to the control module, and the display component is configured to emit imaging light under control of the control module;

wherein the polarization state adjusting unit is electrically connected to the control module, wherein the polarization state adjusting unit is configured to modulate, in a first display period $t_1$, the imaging light into polarized light in a first polarization direction, and the polarized light in the first polarization direction is reflected to the imaging module through the metal wire grid, and wherein the polarization state adjusting unit is configured to modulate, in a second display period $t_2$, the imaging light into polarized light in a second polarization direction, and the polarized light in the second polarization direction is transmitted to the reflector through the metal wire grid, and reflected to the imaging module through the reflector; and wherein the imaging module is configured to transport the polarized light in the first polarization direction or the polarized light in the second polarization direction to a windshield, and the windshield reflects the polarized light in the first polarization direction or the polarized light in the second polarization direction into a human eye for imaging, wherein the imaging light emitted from the display component is the polarized light in the first polarization direction or the polarized light in the second polarization direction, and the polarization state adjusting unit comprises a twisted nematic liquid crystal cell or an electrically controlled birefringence liquid crystal cell.

20. The head up display system of claim 19, wherein the display component comprises an organic light-emitting display panel and a polarizer located on the light-emitting side of the organic light-emitting display panel, or the display component comprises a liquid crystal display panel.

* * * * *